US012629659B2

(12) United States Patent
    Lu et al.

(10) Patent No.: US 12,629,659 B2
(45) Date of Patent: May 19, 2026

(54) ADSORBENT, PREPARATION METHOD THEREFOR AND USE THEREOF

(71) Applicant: City University of Hong Kong Shenzhen Futian Research Institute, Shenzhen (CN)

(72) Inventors: Jian Lu, Shenzhen (CN); Zhengyi Mao, Shenzhen (CN); Fengqian Hao, Shenzhen (CN); Binbin Zhou, Shenzhen (CN)

(73) Assignee: City University of Hong Kong Shenzhen Futian Research Institute, Shenzhen (CN)

( * ) Notice: Subject to any disclaimer, the term of this patent is extended or adjusted under 35 U.S.C. 154(b) by 769 days.

(21) Appl. No.: 18/061,193

(22) Filed: Dec. 2, 2022

(65) Prior Publication Data

US 2024/0017243 A1      Jan. 18, 2024

(30) Foreign Application Priority Data

Jul. 13, 2022      (CN) .......................... 202210827510.0

(51) Int. Cl.
    B01J 20/28      (2006.01)
    B01J 20/30      (2006.01)
    C09K 3/32       (2006.01)
    G01N 1/10       (2006.01)

(52) U.S. Cl.
    CPC ... B01J 20/28045 (2013.01); B01J 20/28004 (2013.01); B01J 20/28085 (2013.01); B01J 20/3007 (2013.01); C09K 3/32 (2013.01); G01N 1/10 (2013.01); G01N 2001/1056 (2013.01)

(58) Field of Classification Search
    CPC ............ B01J 20/28045; B01J 20/28004; B01J 20/28085; B01J 20/3007; B01J 20/28054; B01J 20/26; C09K 3/32; G01N 1/10; G01N 2001/1056; A61B 10/0051; B01D 15/00
    See application file for complete search history.

(56) References Cited

U.S. PATENT DOCUMENTS

2023/0141251 A1* 5/2023 Ozdoganlar ....... A61B 10/0051
                                                   73/863

FOREIGN PATENT DOCUMENTS

CN          102784014 A      11/2012
CN          106581762 A      4/2017
CN          112221476 A      1/2021
            (Continued)

OTHER PUBLICATIONS

Y. Cui, Y. J. Wang, Z. Y. Shao, A. R. Mao, W. W. Gao, H. Bai, Smart Sponge for Fast Liquid Absorption and Thermal Responsive Self-Squeezing. Adv. Mater. 2020, 32, 1908249 (Year: 2020).*
(Continued)

*Primary Examiner* — Jennifer Wecker
*Assistant Examiner* — Steven Ray Castaneda
(74) *Attorney, Agent, or Firm* — NKL Law; Allen Xue

(57) ABSTRACT

An absorbent, a preparation method therefor and use thereof are provided. The absorbent has a liquid channel, and the liquid channel has a low-tortuous porous structure. The absorbent can realize fast and large-scale absorption of various liquids without consuming external energy and not requiring additional apparatuses when in use. The absorbent can be used for efficient, safe and comfortable medical sampling and can also be used for recovery of various liquids.

7 Claims, 11 Drawing Sheets

Cellular channels

(56)                  References Cited

FOREIGN PATENT DOCUMENTS

| | | |
|---|---|---|
| CN | 113662746 A | 11/2021 |
| CN | 113899897 A | 1/2022 |

OTHER PUBLICATIONS

Ring, T.P.; Langer, S.C. Design, Experimental and Numerical Characterization of 3D-Printed Porous Absorbers. Materials 2019, 12, 3397 (Year: 2019).*
EPO Machine Translation of CN113662746A (Year: 2025).*

* cited by examiner

Fig. 1a Cellular channels
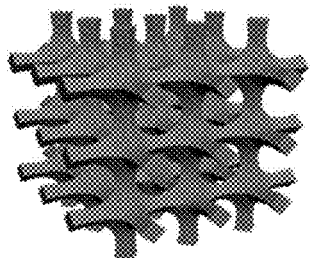
Fig. 1b Random channels
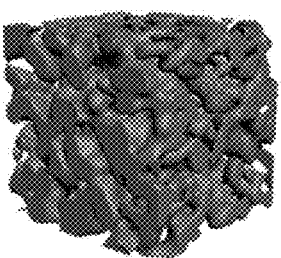
Fig. 2a
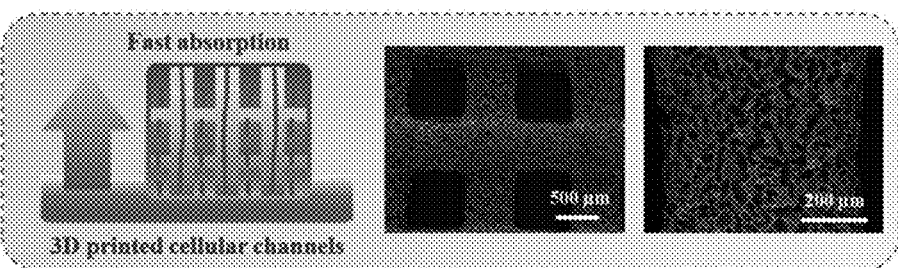
Fig. 2b
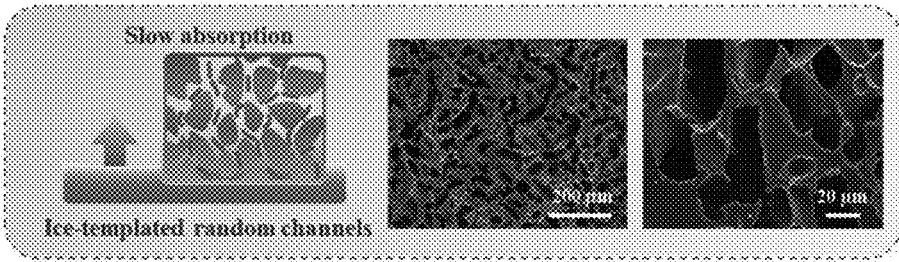

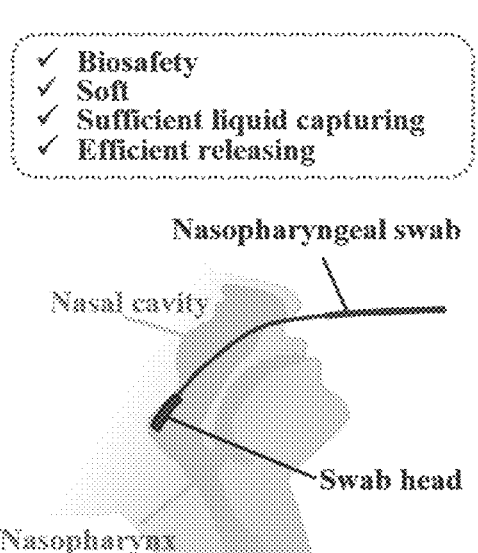
FIG. 13
Fig. 14a
Fig. 14b
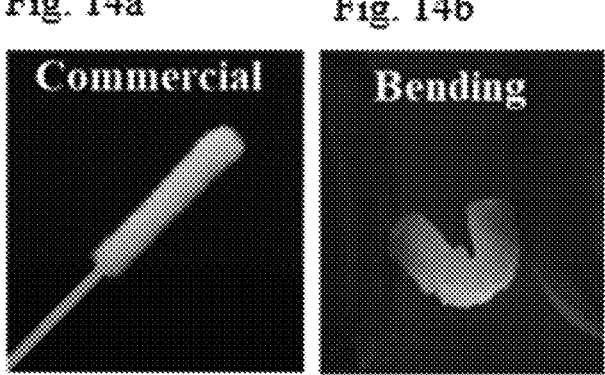
Fig. 14c
Fig. 14d
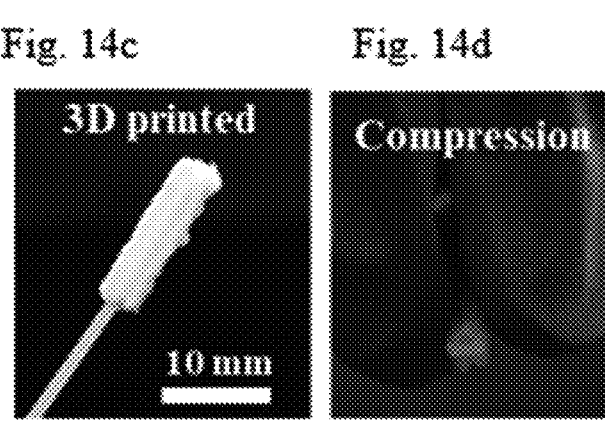

ADSORBENT, PREPARATION METHOD THEREFOR AND USE THEREOF

The present application claims the priority of the prior application No. 202210827510.0 submitted to China National Intellectual Property Administration on Jul. 13, 2022, which is entitled "Absorbent, preparation method therefor and use thereof". The entire content of the prior application is incorporated herein by reference.

TECHNICAL FIELD

The present disclosure belongs to the field of materials, and specifically relates to an absorbent, a preparation method therefor and use thereof.

BACKGROUND ART

Fast liquid collection and transport is of great importance and urgency in various applications such as oil spilling, liquid collection and medical sampling. So far various materials and techniques have been proposed for effective liquid absorption, and can be mainly categorized into the following three types. i) Material design. Surfaces with different wettability can be obtained by designing the chemical composition of the absorbent. A large number of materials have been developed that exhibit high performance in liquid absorption, including carbon-based materials, organic silicone and biomaterials. ii) Surface modification. The wettability of the absorbent can be altered by surface modification, such as etching, particle decoration and in-situ growth. Various substrates can be modified by surface modification so as to significantly increase absorption capacity and reduce material costs. iii) Use of additional energy or apparatuses such as electrical energy and suction pumps. However, efficient liquid absorption with environmentally friendly development mode and low cost is still extremely practical and desired.

SUMMARY OF THE INVENTION

In view of the state of the prior art, the present disclosure firstly provides a low-tortuosity mechanism for fast liquid absorption and provides an absorbent with a special structure based on the mechanism, so that the efficient and large-amount absorption of various liquids can be realized without consuming external energy. In view of the fact that the energy dissipated by friction in a tortuous porous structure can impair the liquid absorption efficiency and capacity of the absorbent, the present disclosure provides an effective method for reducing energy dissipation, i.e., designing a low-tortuous liquid channel of the absorbent, and in particular, environmentally friendly, low-cost and efficient liquid absorption can be realized by designing an absorbent with a low-tortuous porous structure. In the present disclosure, the absorbent has a fast liquid absorption capacity for liquids with various viscosities, and can be used for medical sampling, and also can be used for the treatment process after oil spilling or for liquid collection.

The present disclosure provides the following technical solution:

An absorbent, comprising liquid channels with a low-tortuous porous structure.

According to an embodiment of the present disclosure, the absorbent is used for efficient liquid collection, has excellent wettability for various liquids, and also comprises channels that can absorb fatty liquids.

According to an embodiment of the present disclosure, the absorbent is a sponge comprising a framework consisting of porous filaments, the gap is provided between the porous filaments, the gap forms the liquid channel, and the gap between the porous filaments is of a low-tortuous porous structure.

According to an embodiment of the present disclosure, the gap between the porous filaments is a 3D interconnected layered liquid channel and has a low-tortuous porous structure.

According to an embodiment of the present disclosure, the framework has a multi-layer structure, each layer comprises a plurality of porous filaments arranged in parallel, the porous filaments between two adjacent layers are arranged in a staggered manner, a certain spacing distance is provided between adjacent filaments in each layer, a spacing distance may be provided or not provided between two adjacent layers, the spacing distance between two adjacent layers may be the same or different if provided, and the gaps between the designed filaments have a 3D interconnected layered structure, i.e., the 3D interconnected layered liquid channels, and have a low-tortuous porous structure.

According to an embodiment of the present disclosure, the filament has a diameter of about 100 μm to 1200 μm, illustratively 100 μm, 200 μm, 300 μm, 400 μm, 500 μm, 600 μm, 700 μm, 800 μm, 900 μm, 1000 μm, 1100 μm or 1200 μm.

According to an embodiment of the present disclosure, the filament has a porous structure, and specifically, the filament has a porosity of 50%-70%. Illustratively, the filament has a porosity of 50%, 55%, 60%, 65%, 70% or any point value in a range of combinations of two of these point values.

According to an embodiment of the present disclosure, materials forming the filament include a polymer matrix, and may further include at least one of a thickening agent and a rheology modifier.

According to an embodiment of the present disclosure, the thickening agent includes gelatin, hyaluronic acid, agarose or a mixture thereof.

According to an embodiment of the present disclosure, the rheology modifier includes nanoclay, $SiO_2$, alginate, Pluronic® F-127, carbomer or a mixture thereof.

According to an embodiment of the present disclosure, the polymer includes polyurethane, cellulose, alginate, polyvinyl alcohol, polyacrylamide or a mixture thereof.

According to an embodiment of the present disclosure, the liquid channel has a diameter of about 100 μm to 2000 μm, illustratively 100 μm, 200 μm, 300 μm, 400 μm, 500 μm, 600 μm. 700 μm, 800 μm. 900μ, 1000 μm, 1200 μm, 1400 μm, 1600 μm, 1800 μm, 2000 μm or any point value in a range of combinations of two of these point values.

According to an embodiment of the present disclosure, the absorbent is prepared by a 3D-printing method.

In the present disclosure, the absorbent with the structure has fast absorption speed and great absorption capacity for various liquids, shows advantages of comfort, fastness, low cost, accurate diagnosis and the like when being used for clinical sampling, and has great application prospect and potential.

According to another aspect, the present disclosure provides a method for achieving a 3D interconnected layered liquid channel. Specifically, the present disclosure provides a method for preparing the absorbent, which comprises a following step: preparing the absorbent by 3D printing.

According to an embodiment of the present disclosure, the method specifically comprises: preparing a 3D printable ink; and printing layer by layer to obtain the absorbent.

According to an embodiment of the present disclosure, the 3D printable ink includes a polymer, and may further include at least one of a thickening agent and a rheology modifier.

According to an embodiment of the present disclosure, the polymer, thickening agent and rheology modifier are as defined above.

According to an embodiment of the present disclosure, the 3D printable ink further includes a solvent. Specifically, the solvent is selected from water, illustratively deionized water.

According to an embodiment of the present disclosure, the mass percentage of the polymer in the 3D printable ink is 5%-60%, illustratively 5%, 10%, 15%, 20%, 25%, 30%, 40%, 50%, 60% or any point value in a range of combinations of two of these point values, provided that the sum of the mass percentages of the components in the ink is 100%.

According to an embodiment of the present disclosure, the mass percentage of the thickening agent in the 3D printable ink is 0%-10%, illustratively 0%, 1%, 2%, 3%, 4%, 5%, 6%, 7%, 8%, 9%, 10% or any point value in a range of combinations of two of these point values, provided that the sum of the mass percentages of the components in the ink is 100%.

According to an embodiment of the present disclosure, the mass percentage of the rheology modifier in the 3D printable ink is 0%-10%, illustratively 0%, 1%, 2%, 3%, 4%, 5%, 6%, 7%, 8%, 9%, 10% or any point value in a range of combinations of two of these point values, provided that the sum of the mass percentages of the components in the ink is 100%.

According to an embodiment of the present disclosure, the method specifically comprises: preparing a 3D printable ink: printing a layer body arranged in a filament shape by the 3D printable ink through a 3D printing device, wherein a gap is provided between filaments; then printing a second layer on the first layer in a staggered manner, and so on to obtain the absorbent.

According to an embodiment of the present disclosure, the method further comprises a drying step after layer-by-layer printing, specifically, freeze drying.

The present disclosure also provides use of the absorbent, wherein the absorbent can be used for medical sampling, and also can be used for the treatment process after oil spilling or for liquid collection.

Specifically, the absorbent may be used for efficient, safe and comfortable medical sampling.

According to an embodiment of the present disclosure, the absorbent can be used for the collection of: methanol, isopropanol, liquid paraffin or ethylene glycol.

The present disclosure also provides a swab or a cotton bud, wherein a tip thereof is provided with the absorbent.

According to an embodiment of the present disclosure, the swab or cotton bud may be used for fast medical sampling, in particular as a nasopharyngeal swab for COVID-19 detection. Specifically, the swab or cotton bud may be used for sample collection in the post-COVID era, wherein the sample collection is efficient and comfortable.

According to an embodiment of the present disclosure, the tip of the swab or cotton bud is flexible and is allowed to be bent and compressed. This substantially ensures minimal pain and avoids sneezing and nausea during high frequency testing of the patient.

According to an embodiment of the present disclosure, the swab or cotton bud has excellent biosafety.

According to an embodiment of the present disclosure, the swab or cotton bud shows a fast liquid collection speed and a larger collection capacity and can obtain a higher concentration of sample in a shorter time.

Other systems, methods, and features of the present disclosure become apparent to those of ordinary skill in the art upon examination of the following drawings and detailed description. It is intended that all such additional systems, methods, and features be included within this specification and be within the scope of the present disclosure.

Beneficial Effects of Present Disclosure

1. The present disclosure proposes to utilize a low-tortuous structure to realize the fast and large-scale absorption of various liquids.

2. The absorbent of the present disclosure consumes no external energy.

3. The absorbent of the present disclosure does not require additional apparatuses for use.

4. The absorbent of the present disclosure may be used for efficient, safe and comfortable medical sampling.

5. The absorbent of the present disclosure may be used for recovery of various liquids.

BRIEF DESCRIPTION OF THE DRAWINGS

The drawings are included to provide a further understanding of the present disclosure, and are incorporated in and constitute a part of this specification. The components in the drawings are not necessarily to scale, but emphasize clearly illustrating principles of the embodiments of the present disclosure. The drawings illustrate the embodiments of the present disclosure and together with the description serve to explain the principles of the present disclosure.

FIGS. 1a and 1b provide schematic views of a liquid channel, wherein FIG. 1a represents a liquid channel having an interconnected cellular structure of the present disclosure, and FIG. 1b represents a liquid channel having a random structure in the prior art.

FIGS. 2a and 2b provide schematic diagrams of liquid absorption principle, wherein FIG. 2a represents the structure of the absorbent of the present disclosure and its fast liquid absorption principle, and FIG. 2b represents an ice-templated sponge structure in the prior art and its slow liquid absorption principle.

FIGS. 3a, 3b, and 3c are functional relationship diagrams, wherein FIG. 3a shows viscosity of PU ink as a function of shear rate, FIG. 3b shows storage modulus (G') and loss modulus (G") of the PU ink as a function of strain, and FIG. 3c shows the measured length of the spacing distances and the filament diameter.

FIGS. 10*a* to 10*h* show the absorption properties of liquids having different viscosities, wherein FIG. 10*a* and FIG. 10*b* are methanol; FIG. 10*c* and FIG. 10*d* are isopropanol; FIG. 10*e* and FIG. 10*f* are liquid paraffin; and FIG. 10*g* and FIG. 10*h* are ethylene glycol. The insets in FIGS. 10*a*, 10*c*, 10*e*, and 10*g* represent the liquid absorption at 3 s, 1 s, 14 s and 22 s for a commercial sponge (gray block), an ice-templated sponge (green block), and the 3D printed sponge of the present disclosure (red box), respectively.

FIG. 13 shows the requirements for a nasopharyngeal swab.

FIGS. 14*a* to 14*d* show the results of a comparison of a commercial cotton bud tip and a 3D printed cotton bud tip, and the bending and compression of the 3D printed cotton bud tip, wherein, FIG. 14*a*-shows a tip of a commercial cotton bud; FIG. 14*b* shows a 3D printed sponge of the present disclosure as a tip of a cotton bud; and FIG. 14*c* and FIG. 14*d* show the bending and compression of the 3D printed cotton bud.

DETAILED DESCRIPTION

Figures 3A, 3B, 3C:
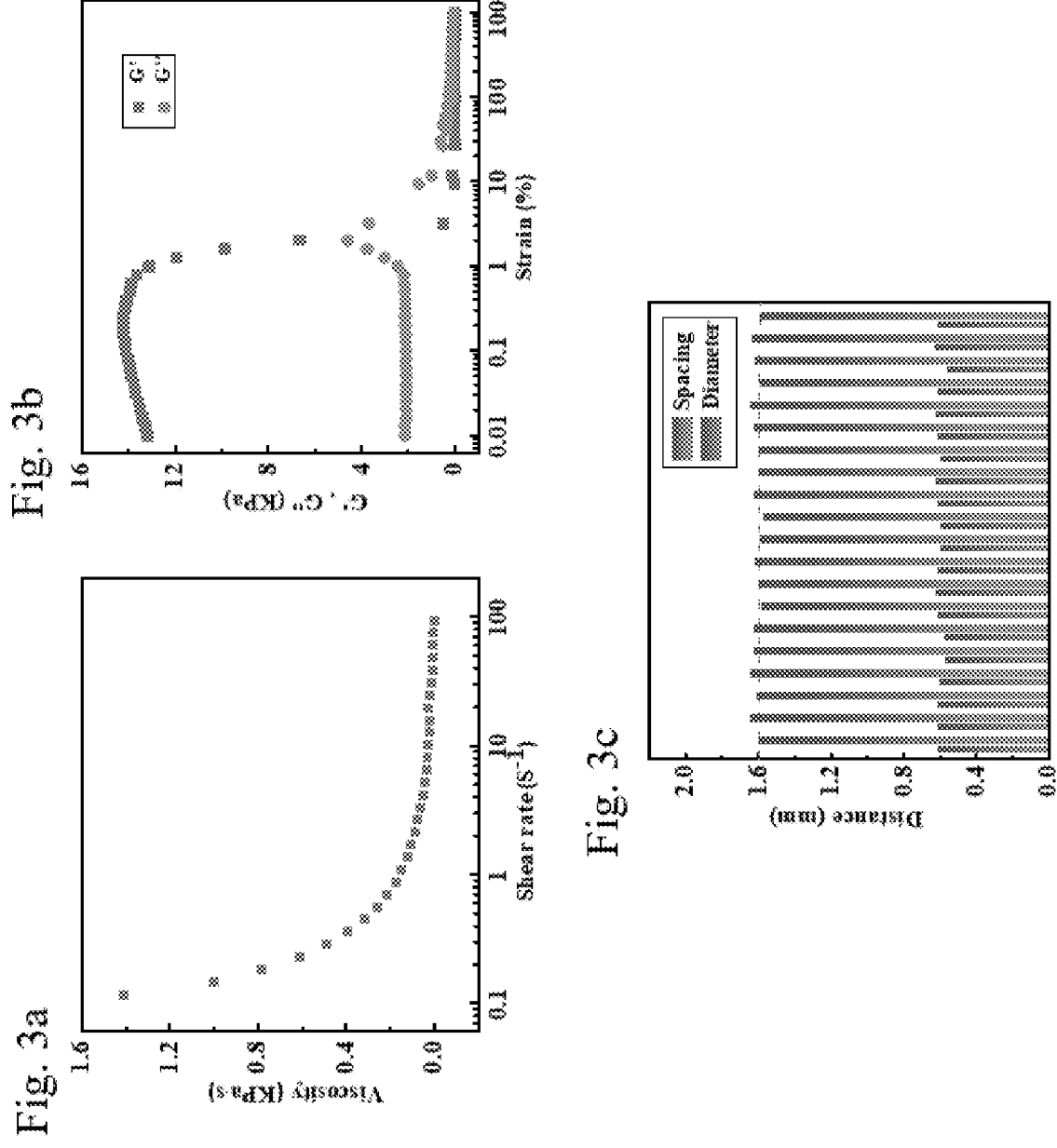

Certain exemplary embodiments will now be described to provide an overall understanding of the structure, function, manufacture, and use principle of the absorbent and method disclosed herein. One or more of these embodiments are illustrated in the drawings. Those skilled in the art will understand that the devices and methods specifically described herein and illustrated in the drawings are non-limiting exemplary embodiments. The features illustrated or described in connection with one exemplary embodiment may be combined with the features of other embodiments. Such modifications and variations are intended to be included within the scope of the present disclosure. Moreover, in the present disclosure, similarly-numbered components of various embodiments generally have similar features when those components have similar properties and/or serve similar purposes.

The present disclosure generally p"ovid's a mechanism and method for preparing an absorbent (specifically such as a sponge) for fast liquid absorption, and more particularly, an absorbent that can be used for fast and comfortable sample collection in the post-COVID era as a medical swab or cotton bud.

As shown in FIG. 1*a* is an absorbent having liquid channels with controllable channel size, low curvature and large porosity according to the present disclosure, which exhibits a high liquid absorption coefficient; and FIG. 1*b* is an absorbent having random liquid channels in the prior art, due to the energy dissipation caused by friction, that is, the tortuous porous structure therein seriously impairs liquid absorption efficiency.

In FIGS. 2*a* and 2*b*, the unique pore structure and liquid absorption mechanism of the absorbent of the present disclosure and the ice-templated sponge in the prior art are summarized. The ice-templated sponge having random channels in the prior art is directly freeze-dried to be used as a sample for standby comparison.

Based on the design in FIG. 1*a* and FIG. 2*a*, the sponge with the structure of the present disclosure is prepared by a 3D printing method, and then freeze-dried for 24 h. The method is specified as follows:

1) preparing a 3D printable ink;
2) based on the design in FIG. 1*a* and FIG. 2*a*, printing a layer body arranged in a filament shape by the 3D printable ink through a 3D printing device, wherein a gap is provided between filaments; then printing a second layer in a staggered manner, and so on;
3) freeze-drying after printing layer by layer to obtain the absorbent (sponge) of the present disclosure.

All sponges are made of the same 3D printable ink.

Specifically, the 3D printable ink includes a polymer, a thickening agent, a rheology modifier and a solvent.

Specifically, the solvent is selected from water, such as deionized water.

The thickening agent includes gelatin, hyaluronic acid, agarose or a mixture thereof. Specifically, the thickening agent is selected from hyaluronic acid.

The rheology modifier includes nanoclay, SiO2, alginate, Pluronic® F-127, carbomer or a mixture thereof. Specifically, the rheology modifier is selected from nanoclay.

The polymer includes polyurethane, cellulose, alginate, polyvinyl alcohol, polyacrylamide or a mixture thereof. Specifically, the polymer is selected from polyurethane (PU).

The mass percentages of components in the 3D printable ink are as follows:

5%-60% of a polymer, illustratively 5%, 10%, 15%, 20%, 25%, 30%, 40%, 50%, 60%;
0%-10% of a thickening agent, illustratively 0%, 1%, 2%, 3%, 4%, 5%, 6%, 7%, 8%, 9%, 10%;
0%-10% of a rheology modifier, illustratively 0%, 1%, 2%, 3%, 4%, 5%, 6%, 7%, 8%, 9%, 10%; the balance of solvent.

As shown in FIGS. 1*a*-1*b* and FIG. 2*a*-2*b*, the 3D printed sponge of the present disclosure showed well-structured (low-tortuous porous structure), which comprising porous framework and 3D interconnected layered liquid channels, whereas only random pore structure is observed in the ice-templated sponge.

As shown in FIGS. 3*a*-3*c*, the 3D printable PU ink of the present disclosure showed shear-thinning properties. After squeezed from a nozzle, the uniform distribution of the printed filaments showed excellent shape fidelity.

Figures 4, 5:
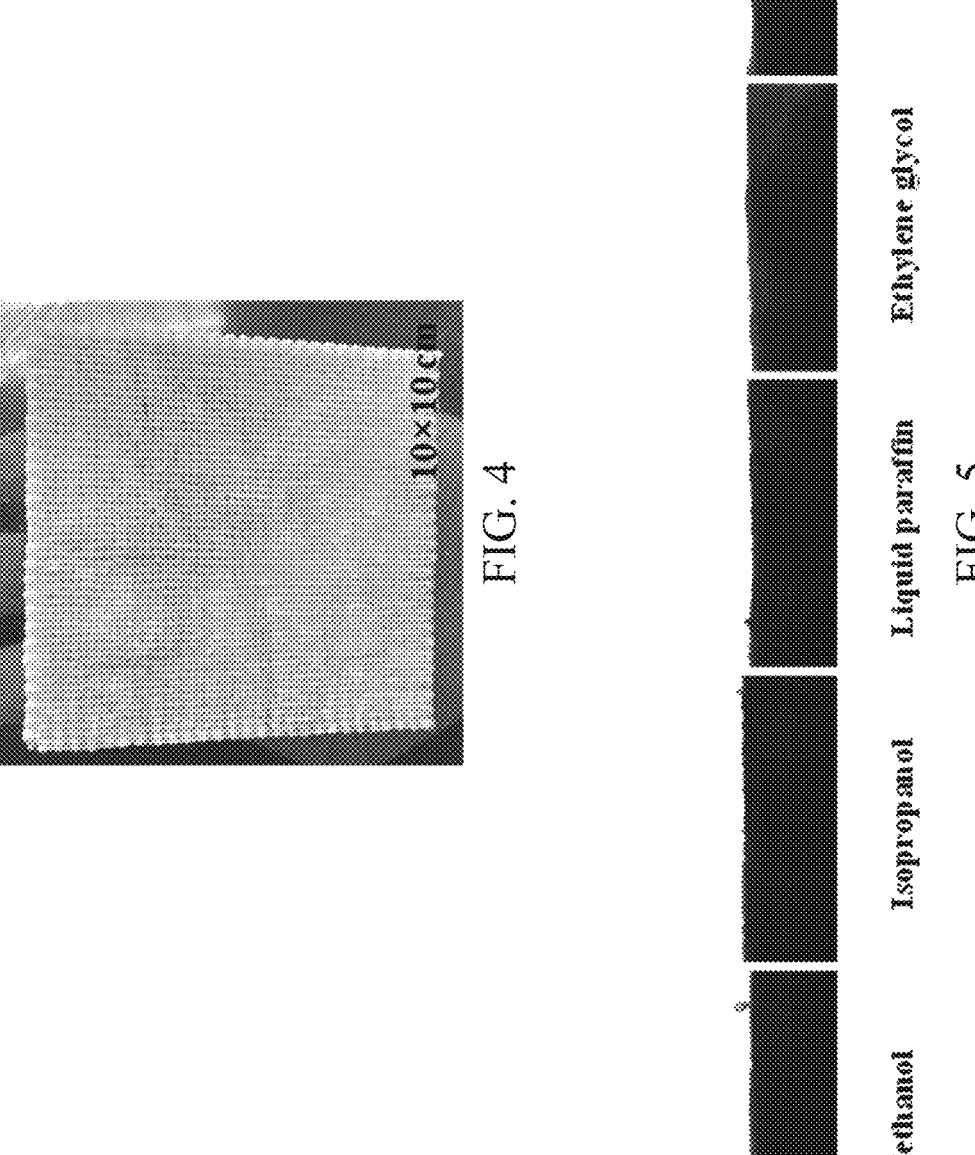
FIG. 4 shows a sample of an absorbent having a large size of the present disclosure prepared by 3D printing.
FIG. 5 shows contact angles of different liquids on sponges of the present disclosure.

As shown in FIG. 4, the large-size sponge can be prepared by a 3D printing method using the PU ink, which showed excellent 3D printability and great potential in real product manufacturing.

As shown in FIG. 5, the sponge of the present disclosure showed good wettability to various liquids. In the detailed description of the exemplary embodiments, methanol, isopropyl alcohol, liquid paraffin, ethylene glycol and engine oil are used for test wettability. Illustratively, in the sponge, the polymer is polyurethane with a mass fraction of 10%; the thickening agent is hyaluronic acid with a mass fraction of 2%; the rheology modifier is nanoclay with a mass fraction of 4%; and the balance is deionized water.

Figure 6:
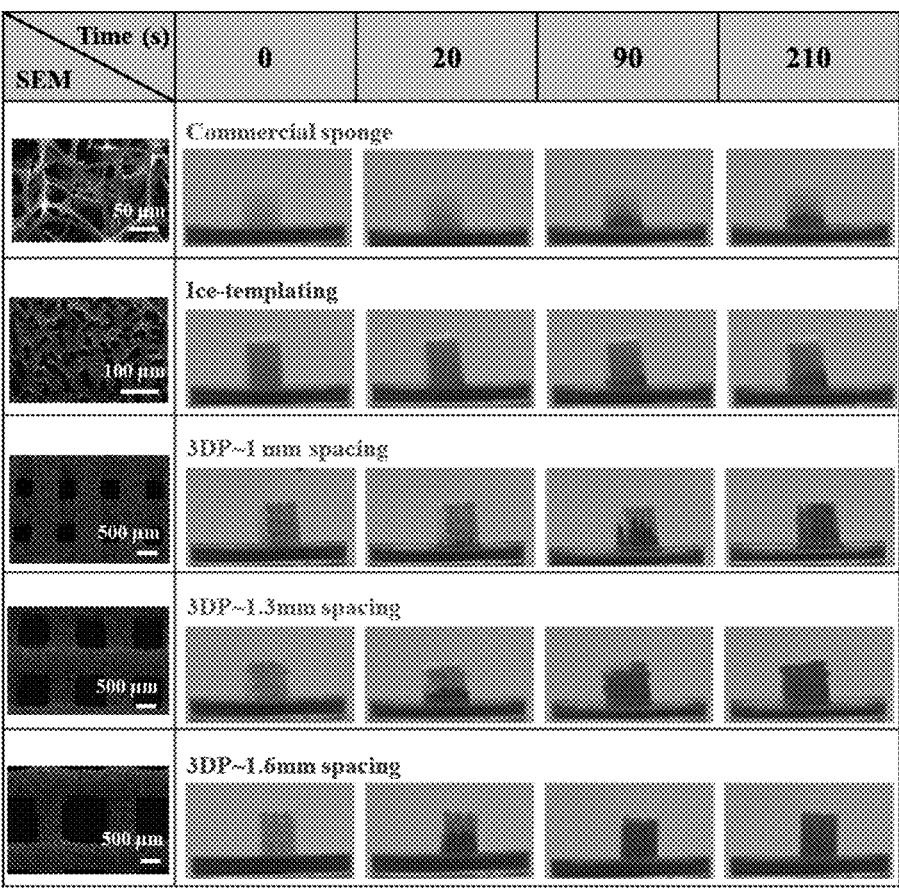
FIG. 6 shows the absorption of sponges with different pore structures of the present disclosure, wherein the absorption is tested with engine oil (having a viscosity of 214.5 mPa·s and dyed in orange for easy to observe) as model liquid.

As shown in FIG. 6, the sponge having specific liquid channels of the present disclosure showed a faster liquid absorption than the sponge having random channels in the prior art. In the detailed description of the exemplary embodiments, engine oil is used as the test liquid. Illustratively, in the sponge, the polymer is polyurethane with a mass fraction of 10%; the thickening agent is hyaluronic acid with a mass fraction of 2%; the rheology modifier is nanoclay with a mass fraction of 4%; and the balance is deionized water. 1 mm, 1.3 mm and 1.6 mm are selected as the print spacing distance.

Figure 7:
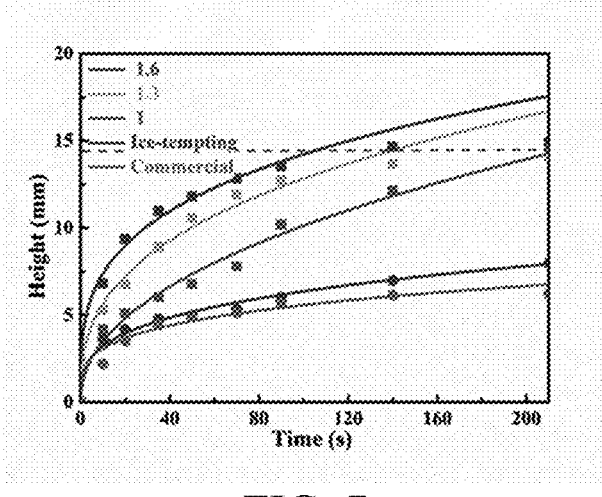
FIG. 7 shows the change in the height of the absorbed engine oil with time. These points are measured from experiments, while the solid line represents the fitted curve. The black dotted line is average height of the sponge. The 3D printed sponge showed a significant improvement in liquid absorption speed, and an increase in the spacing distances would further increase the speed.
Figure 8:
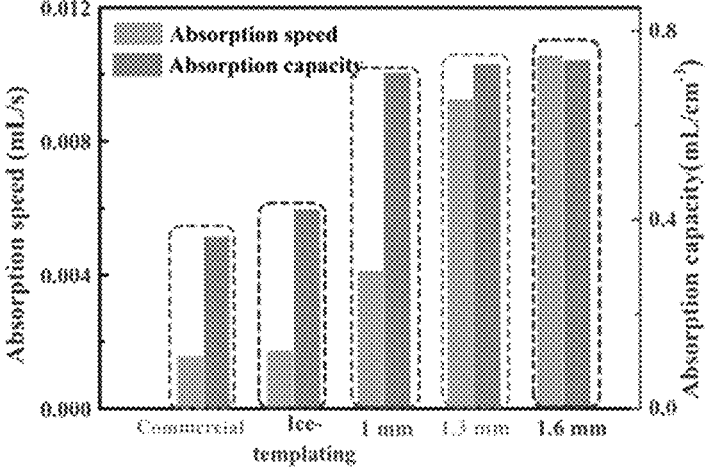
FIG. 8 shows the absorption speed and absorption capacity of different sponges. All 3D printed sponges have similar absorption capacities, much larger than commercial sponges and ice-templated sponges.

As shown in FIG. 7 and FIG. 8, the 3D printed sponge of the present disclosure showed a faster liquid absorption capacity compared to the commercial sponge and the ice-templated sponge. Specifically, FIG. 7 shows the change in the height of the absorbed oil with time. These points are measured from experiments, while the solid line represents the fitted curve. The black dotted line is average height of the sponge. The 3D printed sponge of the present disclosure showed a significant improvement in liquid absorption speed, and it can be seen that a larger spacing distance (i.e., channel diameter) would lead to a faster absorption speed. Illustratively, in the sponge, the polymer is polyurethane with a mass fraction of 10%; the thickening agent is hyaluronic acid with a mass fraction of 2%; the rheology modifier is nanoclay with a mass fraction of 4%; and the balance is deionized water. FIG. 8 shows the absorption speed and absorption capacity of different sponges. All 3D printed sponges have similar absorption capacities, much larger than commercial sponges and ice-templated sponges. Illustratively, in the 3D printed sponge, the polymer is polyurethane with a mass fraction of 10%; the thickening agent is hyaluronic acid with a mass fraction of 2%; the rheology modifier is nanoclay with a mass fraction of 4%; and the balance is deionized water.

Figure 9:
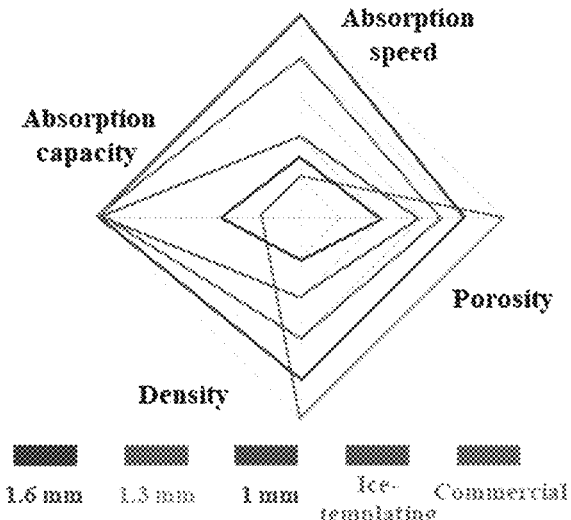
FIG. 9 compares different sponges in terms of absorption speed, absorption capacity, density and porosity.

As shown in FIG. 9, the 3D printed sponge of the present disclosure, especially the sponge with a spacing distance of 1.6 mm, has the characteristics of high liquid absorption speed, large absorption capacity, high porosity, low density and the like. Illustratively, in the 3D printed sponge, the polymer is polyurethane with a mass fraction of 10%; the thickening agent is hyaluronic acid with a mass fraction of 2%; the rheology modifier is nanoclay with a mass fraction of 4%; and the balance is deionized water.

Figure 10:
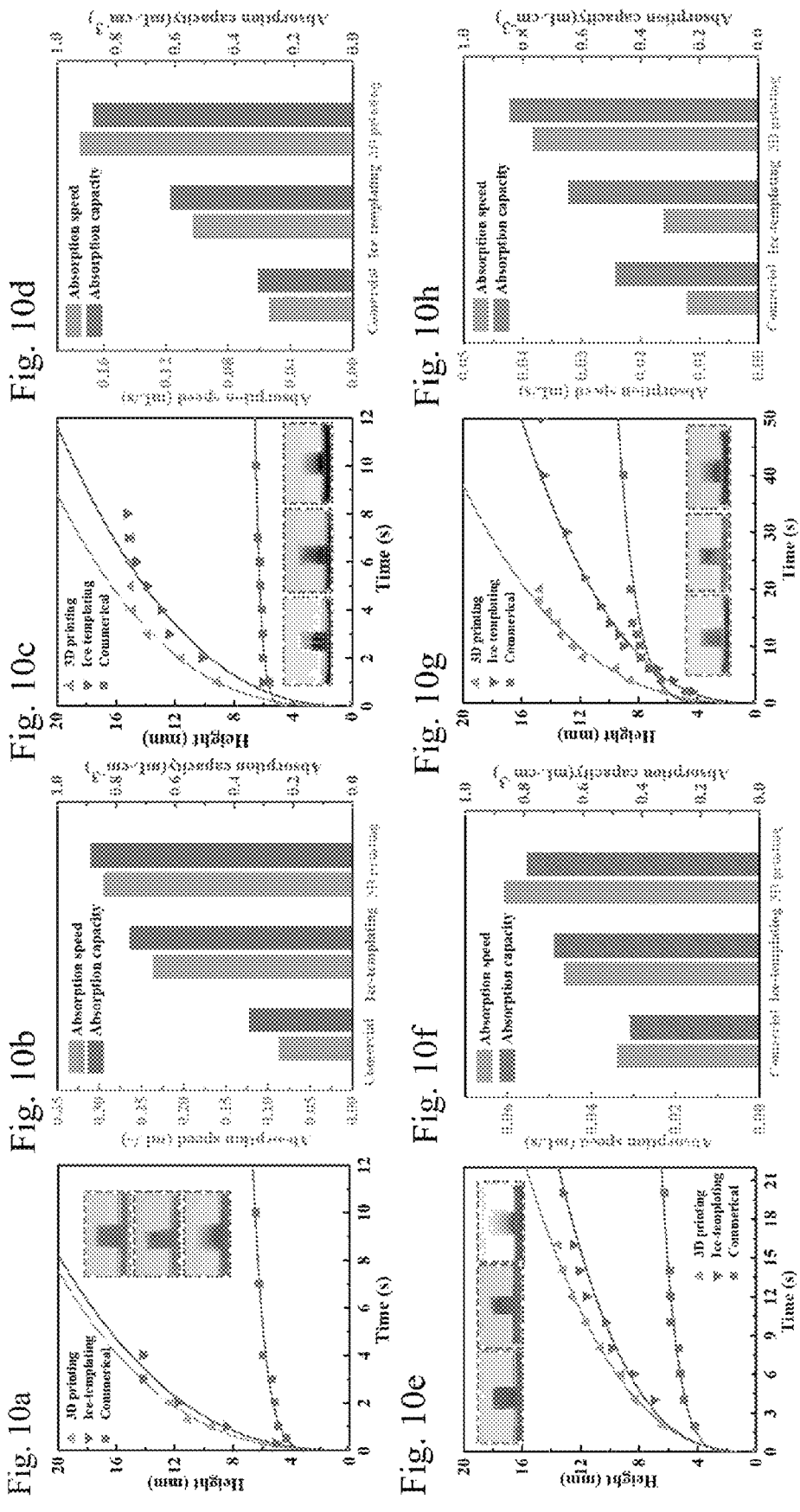

FIGS. 10*a*-10*h* show the fast absorption mechanism of the 3D interconnected liquid channels of the present disclosure, and the absorbent of the present disclosure can be applied to various liquids. In the detailed description of the exemplary embodiments, methanol, isopropanol, liquid paraffin and ethylene glycol are selected as the liquid to test the absorption property; FIG. 10*a* and FIG. 10*b* are methanol: FIG. 10*c* and FIG. 10*d* are isopropanol; FIG. 10*e* and FIG. 11*f* are liquid paraffin; and FIG. 10*g* and FIG. 10*h* are ethylene glycol. The insets in FIG. 10*a*. FIG. 10*c*, FIG. 10*e*, and FIG. 10*g* represent the liquid absorption at 3 s, 1 s, 14 s and 22 s for a commercial sponge (gray block), an ice-templated sponge (green block), and the 3D printed sponge of the present disclosure (red box), respectively. As shown in FIGS. 10*a*-10*h*, the above four liquids all showed excellent absorption capacity. The 3D printed sponge is made of the same material as the ice-templated sponge. Illustratively, in the 3D printed sponge and the ice-templated sponge, the polymer is polyurethane with a mass fraction of 10%; the thickening agent is hyaluronic acid with a mass fraction of 2%; the rheology modifier is nanoclay with a mass fraction of 4%; and the balance is deionized water.

Figure 11:
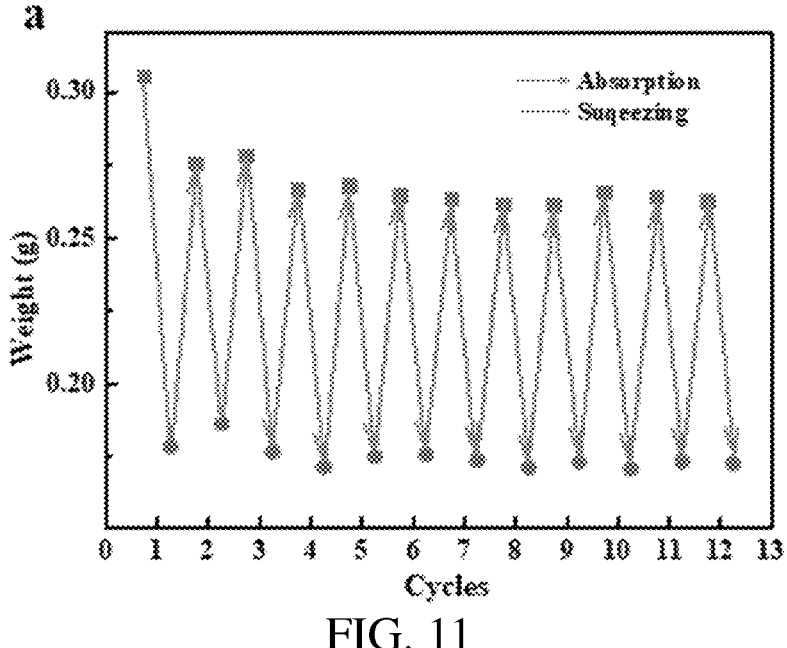
FIG. 11 shows the cyclic absorption of the 3D printed sponge of the present disclosure for liquid paraffin.
Figure 12:
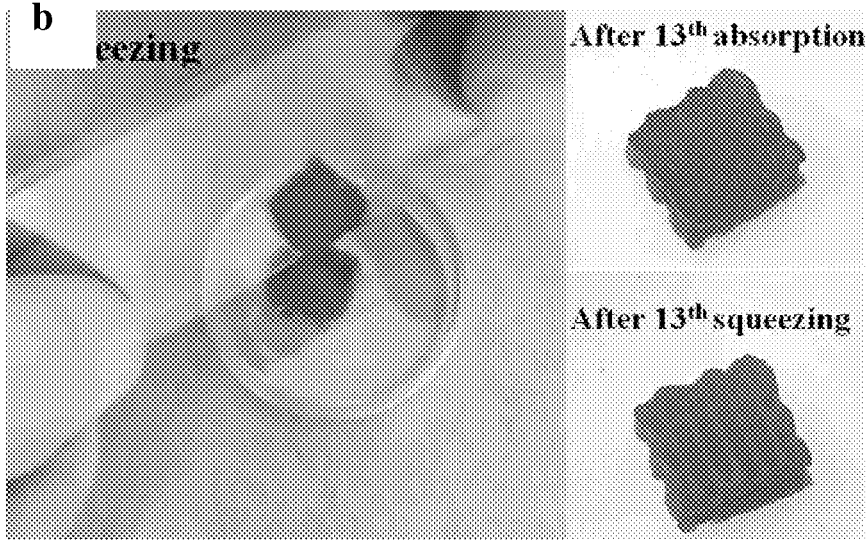
FIG. 12 is a photograph of the 3D printed sponge of the present disclosure squeezed after 13 cycles.

FIG. 11 shows the cyclic absorption of the 3D printed sponge of the present disclosure for liquid paraffin. FIG. 12 is an optical image of the 3D printed sponge of the present disclosure squeezed after 13 cycles. As shown in FIG. 11 and FIG. 12, the 3D printed sponge of the present disclosure showed good reusability and stability even after multiple squeeze-absorption cycles. Illustratively, in the 3D printed sponge, the polymer is polyurethane with a mass fraction of 10%; the thickening agent is hyaluronic acid with a mass fraction of 2%; the rheology modifier is nanoclay with a mass fraction of 4%; and the balance is deionized water.

FIG. 13 shows the requirements for a nasopharyngeal swab. As shown in FIG. 13, a nasopharyngeal swab is inserted into the nostril to capture nasopharyngeal secretions. In the detailed description of the exemplary embodiments, a swab tip with large liquid capturing and releasing capacity is preferred for accurate diagnosis. Furthermore, biosafety and soft mechanical properties are also necessary to improve patient satisfaction.

FIGS. 14*a*-14*d* show the results of a comparison of a commercial cotton bud tip and the 3D printed cotton bud tip of the present disclosure, and the bending and compression of the 3D printed cotton bud of the present disclosure; wherein, FIG. 14*a* shows a tip of a commercial cotton bud; FIG. 14*b* shows a 3D printed sponge of the present disclosure as a tip of a cotton bud; and FIG. 14*c* and FIG. 14*d* show the bending and compression of the 3D-printed cotton bud of the present disclosure. As shown in FIGS. 14*a*-14*d*, the 3D printed cotton bud tip of the present disclosure is flexible and can be allowed to be bent and compressed; and the soft 3D printed cotton bud can greatly reduce pain, sneezing and nausea during high frequency testing of patients. Illustratively, in the 3D printed cotton bud, the polymer is polyurethane with a mass fraction of 10%; the thickening agent is hyaluronic acid with a mass fraction of 2%: the rheology modifier is nanoclay with a mass fraction of 4%; and the balance is deionized water.

Figure 15:
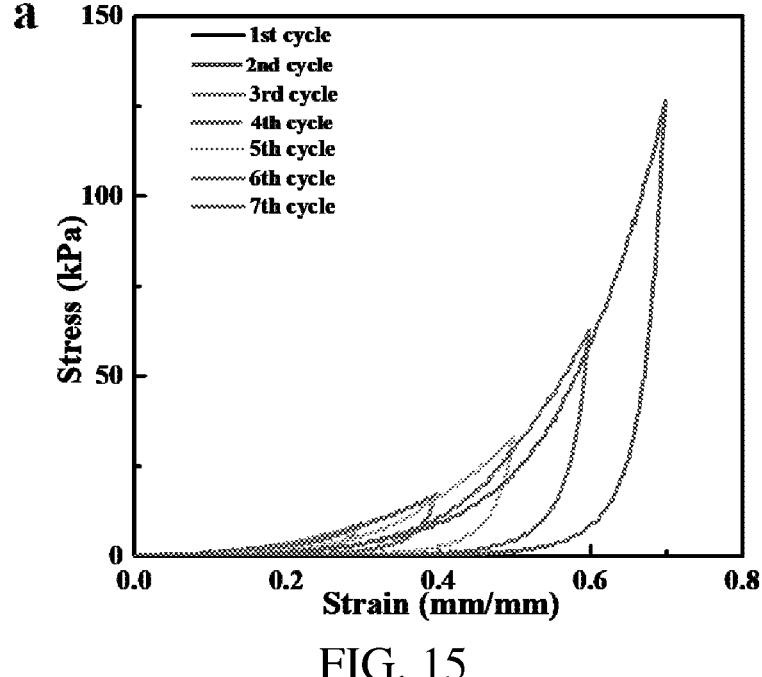
FIG. 15 shows a cyclic compression test with increasing strain.
Figure 16:
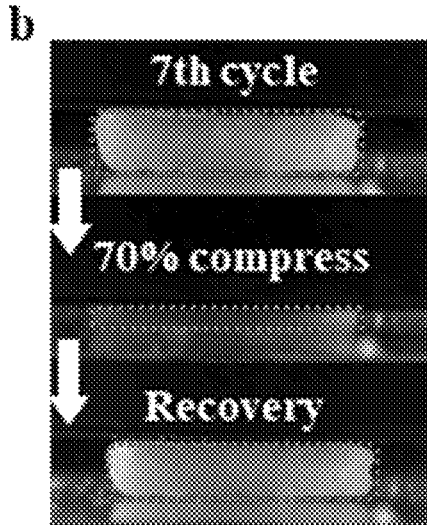
FIG. 16 shows the recovery of the 3D printed sponge of the present disclosure after the 7th compression.

FIGS. 15 and 16 show the results of cyclic compression testing of the incremental strain of the absorbent of the present disclosure. As shown in FIGS. 15 and 16, the 3D printed sponge of the present disclosure recovered well after 7 cycles with a compressive strain as high as 70%. Illustratively, in the 3D printed sponge, the polymer is polyurethane with a mass fraction of 10%; the thickening agent is hyaluronic acid with a mass fraction of 2%; the rheology modifier is nanoclay with a mass fraction of 4%; and the balance is deionized water.

Figure 17:
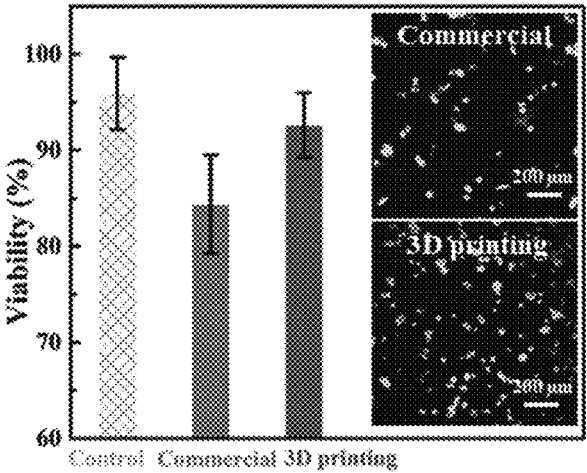
FIG. 17 shows the biocompatibility of the commercial swab and the 3D printed sponge swab of the present disclosure.

As shown in FIG. 17, the 3D printed sponge of the present disclosure showed excellent biocompatibility. After 24 hours of co-culture of MHCC97-L cells with the 3D printed sponge of the present disclosure, the cells obtained a survival rate of 92.6%, indicating that the 3D printed sponge of the present disclosure does not cause any cytotoxic effect. Illustratively, in the 3D printed sponge, the polymer is polyurethane with a mass fraction of 10%; the thickening agent is hyaluronic acid with a mass fraction of 2%; the rheology modifier is nanoclay with a mass fraction of 4%; and the balance is deionized water.

Figure 18:
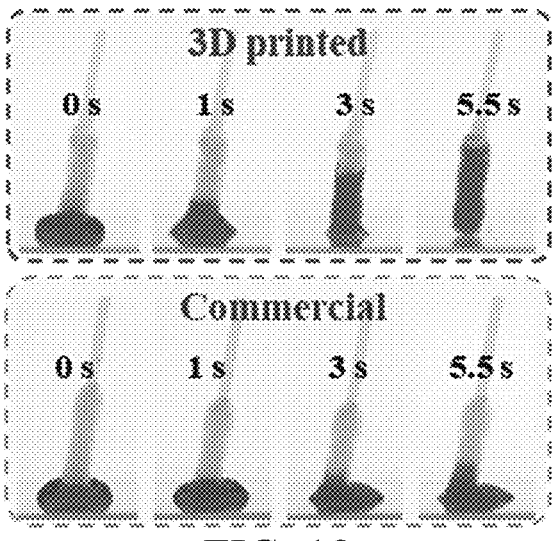
FIG. 18 shows the fast liquid collection of the 3D printed sponge swab of the present disclosure.

As shown in FIG. 18, it takes only 5.5 seconds for the tip of the 3D printed swab of the present disclosure to absorb 100 μL of liquid, whereas the tip of existing commercial swab cannot absorb such a large amount of liquid. Illustratively, in the 3D printed swab, the polymer is polyurethane with a mass fraction of 10%; the thickening agent is hyaluronic acid with a mass fraction of 2%; the rheology modifier is nanoclay with a mass fraction of 4%; and the balance is deionized water.

Figure 19:
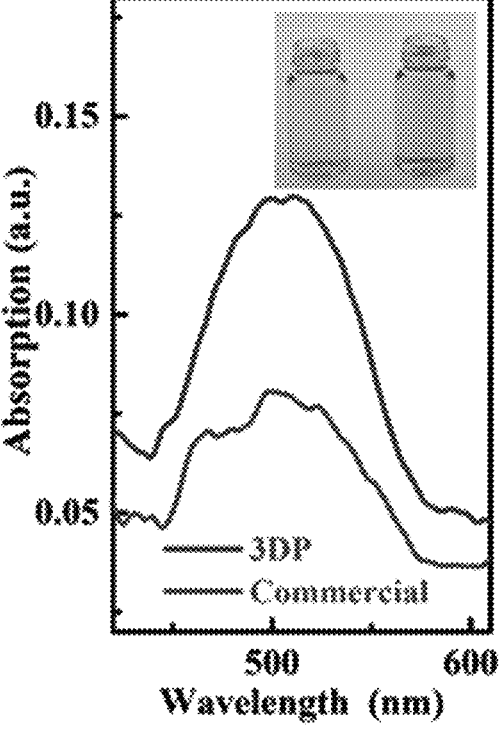
FIG. 19 shows that the 3D printed sponge swab of the present disclosure obtained a high efficiency liquid release capacity of sufficient sample.

As shown in FIG. 19, the 3D printed swab solution of the present disclosure showed a darker color after the absorbed sample was released into a vial, indicating that the sample with a higher concentration was obtained. The fast liquid absorption and efficient release enable 3D printed swabs to collect higher concentration of samples in a shorter time than existing commercial swabs, thereby enabling fast and accurate diagnosis. Illustratively, in the 3D printed swab, the polymer is polyurethane with a mass fraction of 10%; the thickening agent is hyaluronic acid with a mass fraction of 2%; the rheology modifier is nanoclay with a mass fraction of 4%; and the balance is deionized water.

In summary, the present disclosure provides a sponge having a special liquid channel, which can achieve fast liquid absorption and shows potential applications of low cost, fast and comfortable medical sample collection in the post-COVID era.

The aforementioned description of the present disclosure is provided for purposes of illustration and description. It is not intended to be exhaustive or to limit the present disclosure to the precise form disclosed. Many modifications and variations will be apparent to those skilled in the art.

These embodiments are chosen and described in order to better explain the principles of the present disclosure and its practical applications, to thereby enable others skilled in the art to understand the various embodiments of the present disclosure and the various modifications as are suited to the particular use contemplated. It is intended that the scope of the present disclosure and its equivalents be defined by the following claims.

The invention claimed is:

1. An absorbent that is a sponge comprising a plurality of layers, each layer comprises a plurality of porous filaments that are arranged in parallel, wherein the plurality of porous filaments in a first of the two adjacent layers is oriented in a staggered manner relative to the plurality of porous filaments in second of the two adjacent layers, and wherein spaces among the plurality of porous filaments in each of the plurality of layers and between the plurality of layers form 3D interconnected channels throughout the absorbent, and the 3D interconnected channels are configured to hold a liquid when the absorbent is in contact with the liquid.

2. The absorbent according to claim 1, wherein each porous filament has a diameter of about 100 μm to 1200 μm; and/or the liquid each channel has a diameter of about 100 μm to 2000 μm.

3. A method for preparing the absorbent according to claim 1, comprising: preparing the absorbent by 3D printing each of the plurality of layers sequentially.

4. The method according to claim 3, wherein the method comprises: preparing a 3D printable ink; printing a first layer comprising the plurality of porous filaments, wherein two adjacent porous filaments has a gap therebetween; printing a second layer comprising the plurality of porous filaments on the first layer in a staggered manner; and sequentially printing additional layers in the same manner to obtain the absorbent having the plurality of layers.

5. A method for collecting a liquid, comprising contacting the absorbent according to claim 1 with the liquid to be collected so that the liquid moves into the absorbent.

6. The method according to claim 5, wherein the liquid to be collected is a liquid medical sample or an oil spill.

7. A swab or cotton bud, wherein the swab or cotton bud has a tip provided with the absorbent according to claim 1.

* * * * *